US008228930B1

(12) United States Patent
Kim et al.

(10) Patent No.: US 8,228,930 B1
(45) Date of Patent: Jul. 24, 2012

(54) INTERCONNECTION NETWORK ROUTER ARRANGEMENTS AND METHODS THEREFOR

(75) Inventors: John J. Kim, Santa Clara, CA (US); William J. Dally, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1478 days.

(21) Appl. No.: 11/445,934

(22) Filed: Jun. 2, 2006

(51) Int. Cl.
*H04L 12/56* (2006.01)
(52) U.S. Cl. ........................... 370/413; 370/462
(58) Field of Classification Search .............. 370/412, 370/413
See application file for complete search history.

(56) References Cited

U.S. PATENT DOCUMENTS

| | | | | |
|---|---|---|---|---|
| 6,285,679 B1* | 9/2001 | Dally et al. | ................ | 370/413 |
| 6,449,283 B1* | 9/2002 | Chao et al. | ................ | 370/461 |
| 6,557,070 B1* | 4/2003 | Noel, Jr. | ................ | 710/317 |
| 6,563,818 B1* | 5/2003 | Sang et al. | ................ | 370/379 |
| 6,931,020 B1* | 8/2005 | Hellwig et al. | ................ | 370/414 |
| 6,990,063 B1* | 1/2006 | Lenoski et al. | ................ | 370/218 |
| 6,992,984 B1* | 1/2006 | Gu | ................ | 370/235 |
| 7,046,633 B2* | 5/2006 | Carvey | ................ | 370/238 |
| 7,154,885 B2* | 12/2006 | Nong | ................ | 370/380 |
| 2001/0038634 A1* | 11/2001 | Dally et al. | ................ | 370/412 |
| 2003/0156597 A1* | 8/2003 | Eberle et al. | ................ | 370/447 |
| 2004/0095927 A1* | 5/2004 | Chang et al. | ................ | 370/388 |
| 2005/0152352 A1* | 7/2005 | Jun et al. | ................ | 370/388 |
| 2007/0079036 A1* | 4/2007 | Mukherjee | ................ | 710/119 |
| 2007/0110087 A1* | 5/2007 | Abel et al. | ................ | 370/412 |

* cited by examiner

*Primary Examiner* — Chirag Shah
*Assistant Examiner* — Daniel Mitchell
(74) *Attorney, Agent, or Firm* — Crawford Maunu PLLC

(57) ABSTRACT

Interconnection router arrangements are implemented using a variety of arrangements and methods. Using one such arrangement, an interconnection network router arrangement sends data units between a set of router inputs and a set of router outputs. The interconnection network router arrangement includes a sub-switch that is capable of selectively transferring a data unit from an array of sub-switch inputs to an array of sub-switch outputs. The sub-switch has a memory circuit for storing the data unit before the data unit is transferred to a sub-switch output and a memory circuit for storing the data unit after the data unit is transferred from the sub-switch inputs and before the data unit is sent to a router output.

10 Claims, 8 Drawing Sheets

INTERCONNECTION NETWORK ROUTER ARRANGEMENTS AND METHODS THEREFOR

FEDERALLY SPONSORED RESEARCH OR DEVELOPMENT

This invention was supported in part by US Government Prime Contract No. NBCH3039003; the U.S. Government may have certain rights in connection with this document.

FIELD OF THE INVENTION

The present invention relates generally to interconnection network router arrangements and methods, and more particularly, to a processor interconnection network router arrangement and method.

BACKGROUND

Interconnection networks for multi-processor systems, high-end routers, switches, and other devices are designed and implemented using many different approaches. The interconnection network can be a critical factor in determining the performance of a multiprocessor system. In particular, the latency and bandwidth of the network can affect system properties, such as the performance of the system during remote memory accesses.

Interconnection network routers are constrained by the "off-chip" bandwidth that can be effectively coupled to an integrated circuit (IC) used for routing control. The amount of such off-chip bandwidth has steadily increased due to advances in signal technology. The bandwidth of an IC is a factor of both the number of ports on the chip and the bandwidth of each port on the chip. Thus, in order to realize an increase in bandwidth, the IC's bandwidth per port or the number of ports (or both) must be increased. Many applications have increased the total bandwidth by increasing the bandwidth per port; however, in certain instances it is desirable to increase the total bandwidth by increasing the number of ports. Commonly used interconnection router architectures exhibit problems with both throughput and with the complexity of various components of the interconnection device as the number of ports increases. Additionally, the physical size limitations of the routers and switches for multi-processor systems are more restrictive than the limitations for routers and switches for other applications, such as the routing of Internet Protocol (IP) packets.

These and other characteristics present challenges to the implementation of interconnection network routers.

SUMMARY

Various aspects of the present invention are directed to methods and arrangements for implementing in a manner that addresses and overcomes the above-mentioned issues.

Consistent with one example embodiment, the present invention is directed to an interconnection network router arrangement that sends data units between a set of router inputs and a set of router outputs. The interconnection network router arrangement includes a sub-switch that is capable of selectively transferring a data unit from an array of sub-switch inputs to an array of sub-switch outputs. The sub-switch has a memory circuit for storing the data unit prior to the data unit being transferred to a sub-switch output and a memory circuit for storing the data unit after the data unit is transferred from the sub-switch inputs and before the data unit is sent to a router output.

Consistent with a further example embodiment, the present invention is directed to an interconnection network router arrangement for routing data units between a set of router inputs and a set of router outputs. The interconnection network router arrangement includes a set of input arbitration circuits that select a data unit from a group of data units. In response to such a selection, the interconnection network router arrangement sends selected data units using a shared interconnection resource. The interconnection network router arrangement also includes a set of one or more second arbitration circuits for selecting a data unit from the selected data units.

Consistent with a further example embodiment, the present invention is directed to a method for routing data units using an interconnection network router. The interconnection network router selects a data unit from data units stored at the router inputs. The selection is independent of an availability of a destination output of the data unit. The interconnection network router sends the data unit to an input buffer independent of the availability of the destination output of the data unit. The interconnection network router determines the availability of the destination output of the data unit and sends the data unit to the destination output in response to the determination.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

BRIEF DESCRIPTION OF THE DRAWINGS

The invention may be more completely understood in consideration of the following detailed description of various embodiments of the invention in connection with the accompanying drawings, in which.

Figure 1:
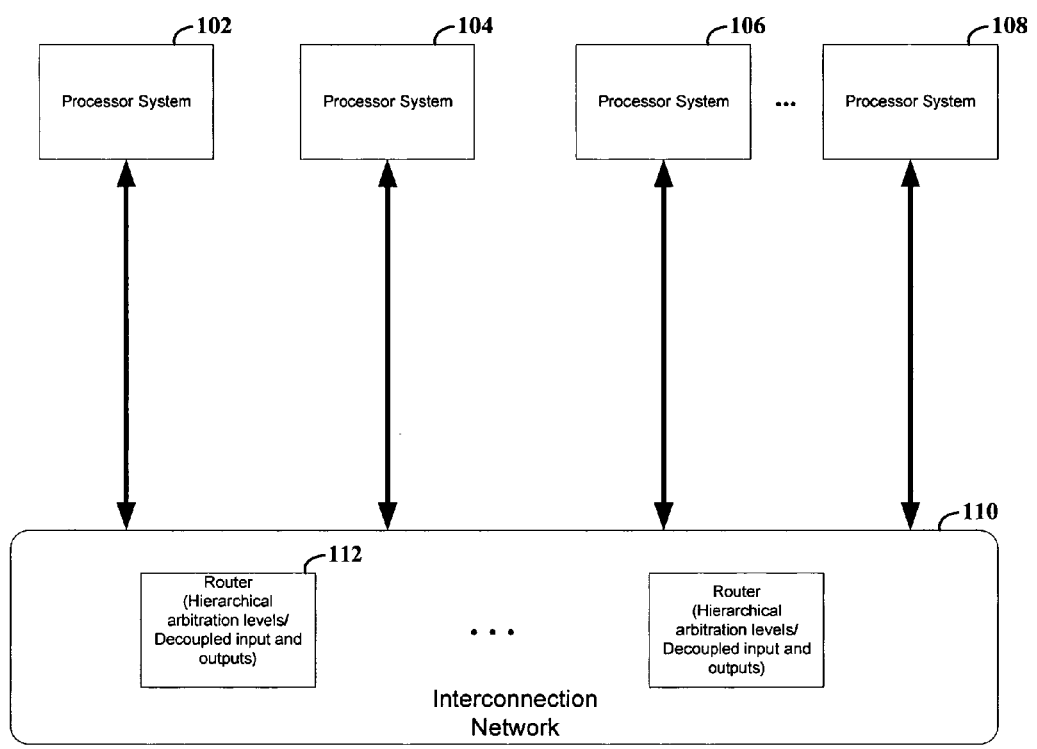
FIG. 1 shows block diagram of an interconnection network router system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention is believed to be applicable to a variety of interconnection network router arrangements and approaches for implementing the same. While the present invention is not necessarily limited to such applications, an appreciation of various aspects of the invention is best gained through a discussion of examples in such an environment.

According to an embodiment of the present invention, an interconnection network router arrangement is implemented such that data from inputs of the interconnection network router arrangement can be sent to an intermediate point in the interconnection network router arrangement without determining the availability of the destination output for the data. This decoupling of the output availability from the intermediate point is particularly suited for local arbitration at the inputs. In one instance, the data can next be sent to another intermediate point without determining the availability of the destination output for the data.

According to another embodiment of the present invention, a set of local-arbitration circuits each select a data unit from a group of data units. A second arbitration circuit selects a data unit from the selected data units. In response to the selection, the data unit is sent using a shared interconnection.

According to another example embodiment of the present invention, a method is implemented for facilitating the transfer of data from a router input to a router output through an interconnection network router. A control arrangement determines the output to which the data is sent. A sub-switch is selected from a set of sub-switches in response to the determined output. Each sub-switch has a set of inputs and a set of outputs. A memory is used for storing data units to be sent from an input of the sub-switch to an output of the sub-switch. A second memory is used for storing data at the outputs of the sub-switch. The sub-switch and buffer arrangement is particularly useful for allowing data units to be sent to the buffers without determining the availability of an interconnection network router resource to be used subsequently.

In one embodiment of the present invention, the techniques discussed herein can be used by an interconnection network router having a high number of ports.

For example, radix-64 and higher-radix routers can be implemented using variations of the present invention.

Turning now to the figures, FIG. 1 depicts an interconnection network router system having processor systems 102 to 108, interconnection network 110 and router 112. The processor systems 102 to 108 represent an assortment of systems.

Examples of such systems include, but are not limited to, parallel computers, shared memory systems, telecom switches, system-on-a-chip applications, input/output switches and router fabrics.

The processor systems 102 to 108 send and receive data between themselves. In one instance, the data is sent using data packets. A data packet is a collection of data bits that contain data and destination information. The destination information is sometimes part of the header of the packet. The interconnection network 110 uses the destination information to determine where the data is sent. Thus, a large data transmission between two processing units can be broken into multiple packets, and using the destination information, each packet is capable of being routed independently from other packets of the transmission. When a data packet is transmitted between an input of an interconnection network router and an output of the interconnection network router, the packet can be further broken down into several data units, sometimes referred to as flits. The interconnection network router determines the correct output to send the data units based upon the destination information. The data units are then sent through the interconnection network router to the appropriate output. To send the data units to the appropriate output, the interconnection network router must determine the correct path by which to send the data unit as well as provide arbitration between other data units vying for interconnection network router resources.

In one embodiment of the present invention, the interconnection network router 112 uses a hierarchical arbitration (i.e., multiple stages) to allocate router resources to the data units. For example, the interconnection network router may have local arbiters for the various inputs and a global arbiter at the outputs for arbitration between the arbitration winners at the inputs. In another example, the first stage of arbitration is decoupled from the second stage of arbitration in that the data units can be sent to an intermediate location within the interconnection network router without a grant from the second stage of arbitration.

In another embodiment of the present invention, the interconnection network router 112 has an array of sub-switches. The sub-switches have memory buffers at their inputs and outputs and are arranged in an array. The data units are sent from an input to an output using one or more of the sub-switches.

Figure 2A:
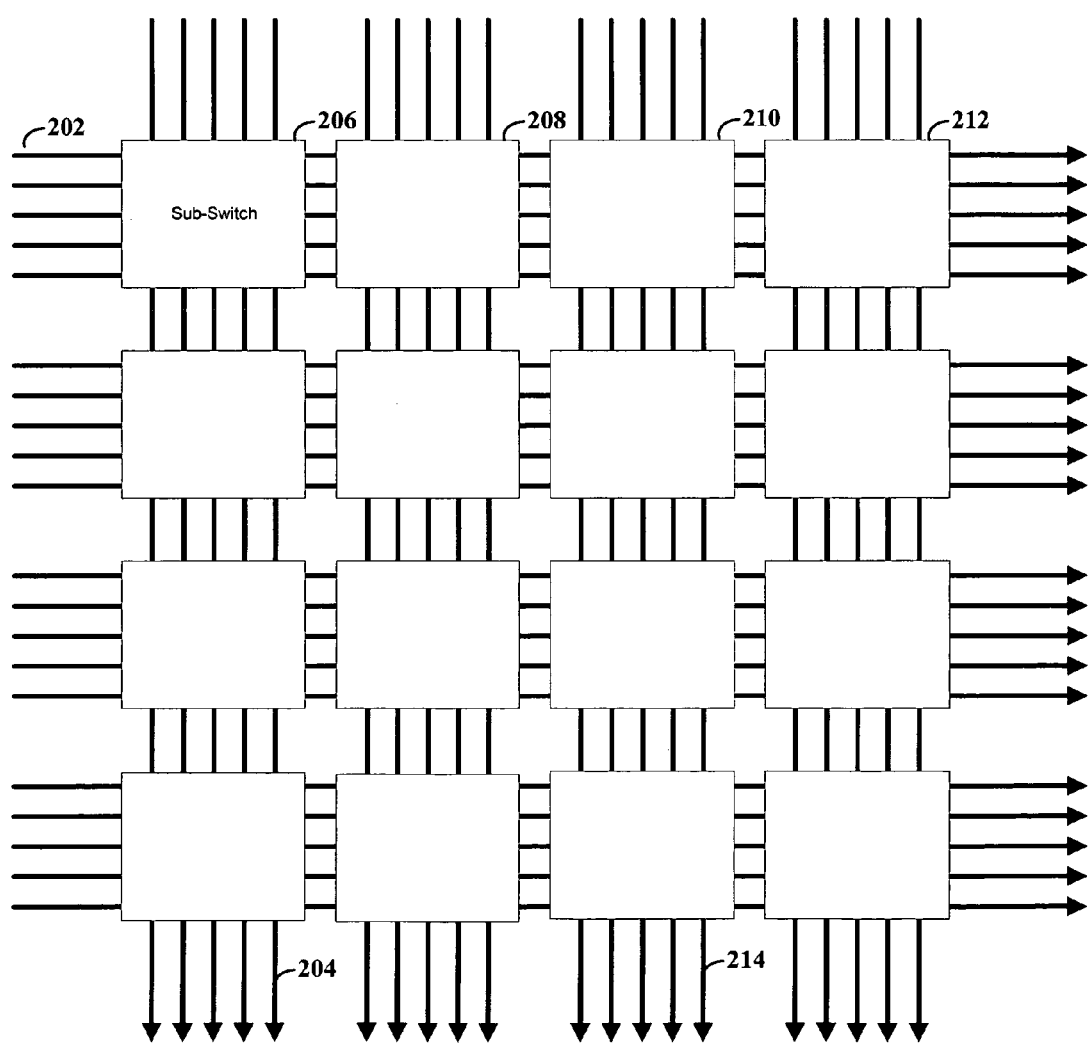
FIG. 2A shows block diagram of an array of sub-switches used in an interconnection network router, according to an example embodiment of the present invention.

FIG. 2A shows a diagram of an array of sub-switches used in an interconnection network router, according to an example embodiment of the present invention. The sub-switch 206 is shown with five inputs and five outputs; however, the sub-switches may have as few as two inputs and two outputs and may have as many inputs as allowed by the interconnection network router restraints (e.g., manufacturing limitations or interconnection network router size). FIG. 2A also depicts the array of sub-switches as a four-by-four array. The array may have as few as two sub-switches, and as to the maximum size of the array, it is limited only by the interconnection network router restraints.

A data unit traverses from an input to an output using the array of sub-switches. Depending upon the destination output, a data unit originating at input 202 can be directed to one of sub-switches 206, 208, 210 and 212. For example, a data unit originating at input 202 having a destination of output 204 would first be directed to sub-switch 206. Within sub-switch 206, the data unit is directed to output 204. In another example, a data unit originating at input 202 having a destination of output 214 would first be directed to sub-switch 210 and then to output 214.

In one embodiment, the sub-switches can be further divided into secondary sub-switches within each larger sub-switch. This division of continually smaller sub-switches within sub-switches is not limited to two levels. Instead, the number of sub-switches and levels of sub-switches can be varied depending upon the application. This division of smaller sub-switches can be particularly useful as the number of inputs and outputs increases.

In another embodiment, the sub-switches have one or more memory buffers for storing the data units. The memory buffer temporarily stores the data unit as it is sent from an input to an output of the sub-switch. In one example, a memory buffer exists for each input and each output. When the sub-switch receives the data unit, the sub-switch stores the data unit in memory buffer. The sub-switch next sends the data unit to an output memory buffer and finally to the output. Buffering a data unit at the input allows for the data unit to be sent to the input of the sub-switch even if the sub-switch is not immediately able to send the data unit to the output or output buffer. Similarly, buffering a data unit at the output allows for the data unit to be sent to the output buffer even if the data unit cannot be immediately sent to the destination output. Thus, in terms of routing data units to and from the sub-switch, the input and outputs of the sub-switch can be effectively decoupled from one another.

In another embodiment, the interconnection network router is implemented with virtual channels and corresponding buffers. Virtual channels are buffers that are associated with a physical input or output channel. Such virtual channels allow the interconnection network router to function, within the router, as though a single physical input or output has multiple inputs or outputs. The interconnection network is implemented with input buffers corresponding to each input virtual channel. This correlation between the input buffer and the input virtual channels (e.g., a dedicated buffer for each input virtual channel) can be particularly useful for reducing the complexity of the allocation scheme. In another instance, the interconnection network has output buffers corresponding to each output virtual channel.

Figure 2B:
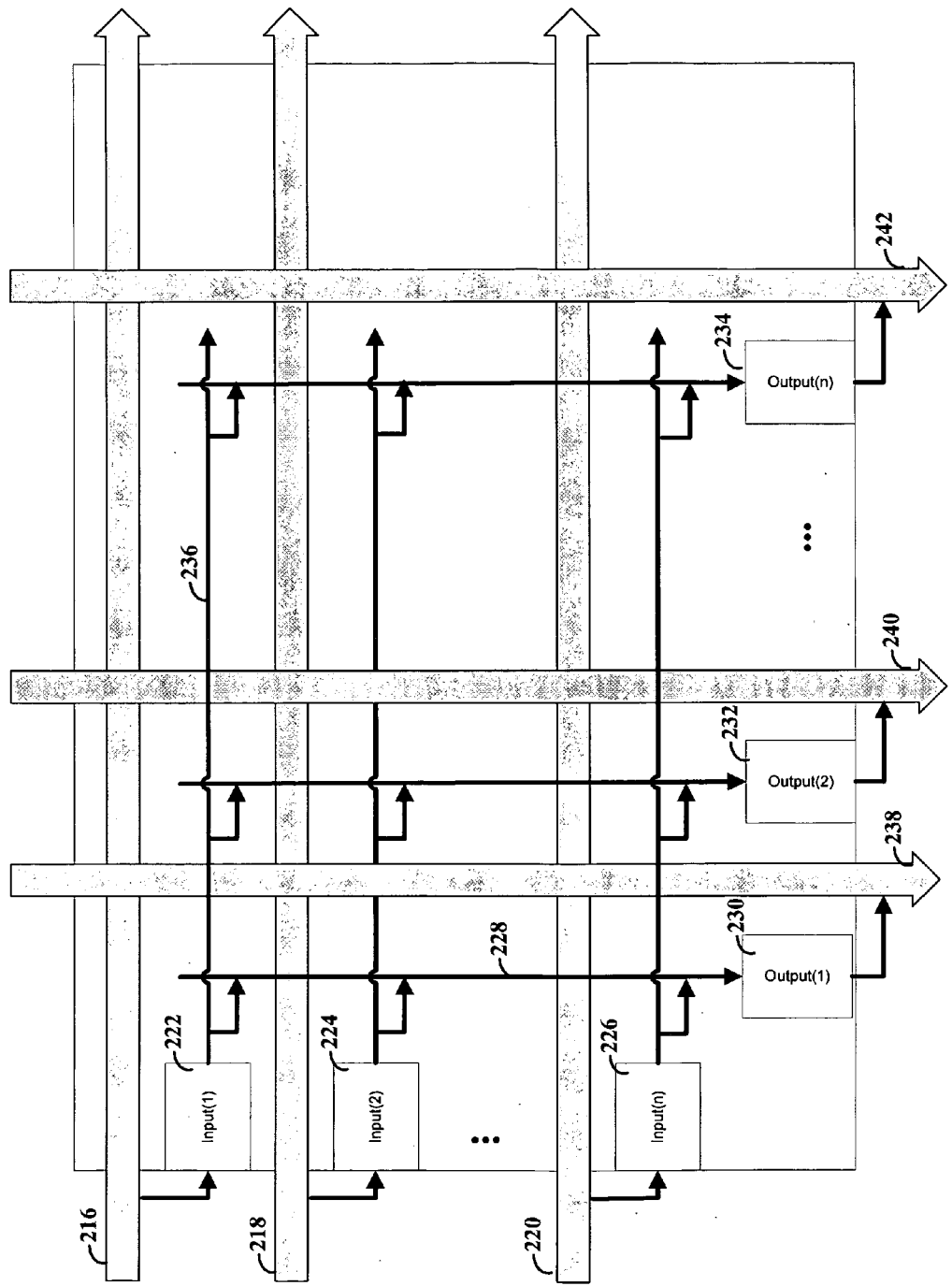
FIG. 2B shows a block diagram showing an example sub-switch, according to an example embodiment of the present invention.

FIG. 2B depicts an example sub-switch, according to an example embodiment of the present invention. Inputs 216, 218 and 220 connect to buffers 222, 224 and 226, respectively, and outputs 238, 240 and 242 connect to buffers 230, 232 and 234, respectively. In one embodiment, the buffers are implemented using separate physical memory blocks for each input and each output. In another embodiment, the buffers can be implemented using shared physical memory blocks that act as a logical buffer for each of the inputs and outputs.

The memory buffers connect to the internal interconnection network router of the sub-switch as shown by lines 228 and 236. These lines are used to selectively send the data units from an input buffer to an output buffer. For instance, the sub-switch stores a data unit received on input 216 in input buffer 222. The sub-switch determines the destination output for the data unit, which also determines the corresponding path through the sub-switch. Upon determining that the path is available, the sub-switch sends the data unit from the input buffer 222 to the destination output buffer. For example, lines 236 and 228 can be used to send the data unit to output buffer 230. The data unit is stored in output buffer 230 until the data unit can be sent using output 238.

In one embodiment, the sub-switches are part of an interconnection network router that provides separate arbitration for inputs and outputs of the network. For instance, one arbitration level determines when to send data units from inputs of the interconnection network router to inputs of the sub-switches. Another arbitration level determines when to send data units from outputs of the sub-switches to outputs of the interconnection network router.

In another embodiment, the interconnection network router is implemented with virtual channels and corresponding sub-switch buffers. The sub-switch is implemented with input buffers corresponding to each input virtual channel. Thus, the correlation between the sub-switch input buffer and the input virtual channels can be particularly useful for reducing the complexity of the allocation scheme. In another instance, the sub-switch has output buffers corresponding to each virtual channel output.

Figure 3:
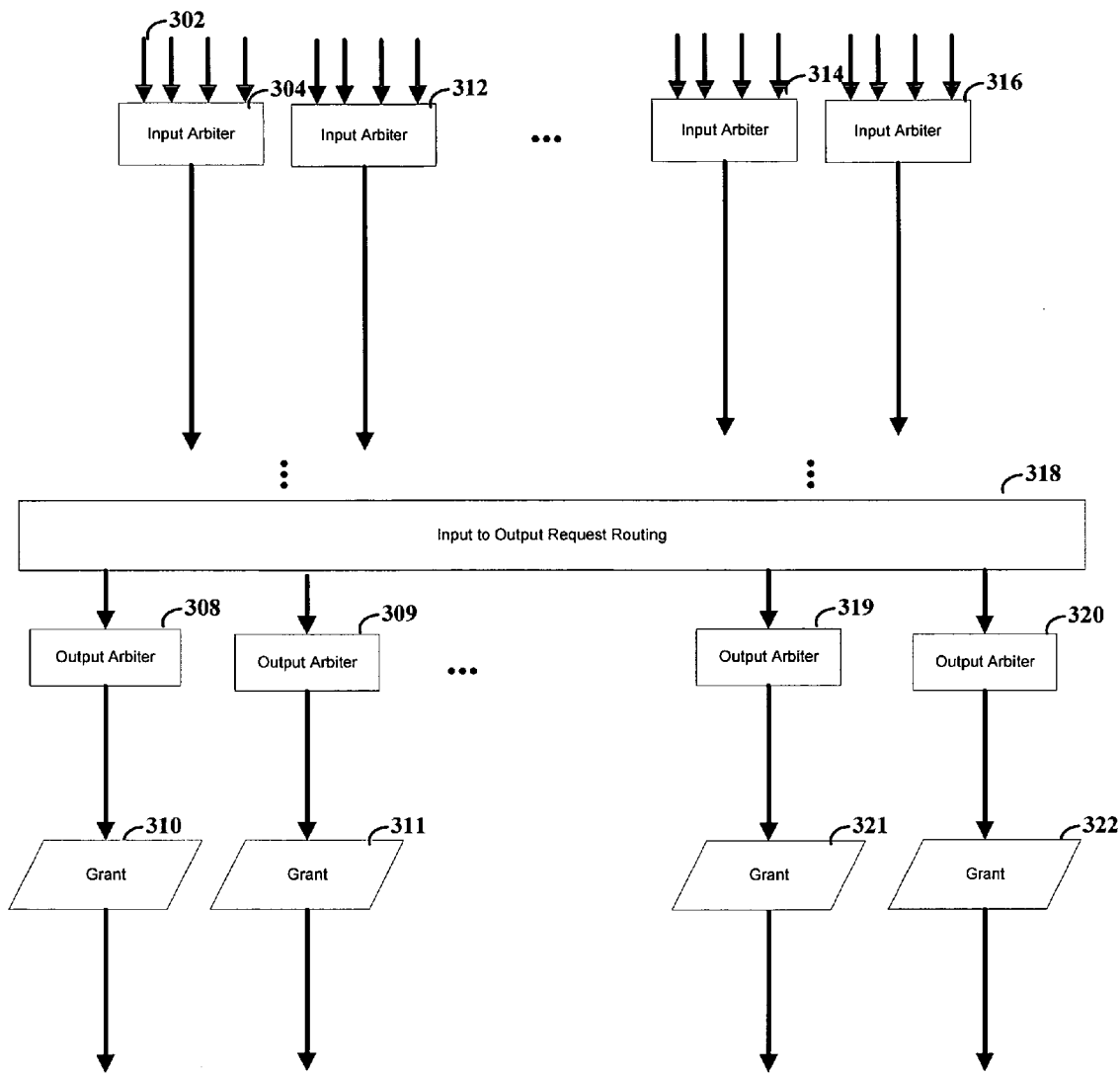
FIG. 3 shows a diagram of a hierarchical arbitration scheme for an interconnection network router, according to an example embodiment of the present invention.

FIG. 3 shows a diagram of a hierarchical arbitration scheme for an interconnection network router, according to an example embodiment of the present invention. The diagram shows two levels of arbitration. The first level of arbitration includes input arbiters 304, 312, 314 and 316, and the second level of arbitration includes output arbiters 308, 309, 319 and 320. While FIG. 3 shows only two levels of arbitration, the present invention is amenable to any number of arbitration levels.

Different arbitration methods can be used to select the data units. A few examples of such arbitration methods include, fixed priority, round-robin, grant-hold, random, rotating, queuing, and matrix arbiters. Further details on interconnection network routers as well as specific arbiter methods can be found in W. J. Dally and B. Towles, (2004), *Principles and Practices of Interconnection Networks*, Morgan Kaufmann, San Francisco, Calif., which is fully incorporated herein by reference.

The input arbiters select from data units vying for shared resources that are used to send data units within the interconnection network router. The input arbiters can be implemented using several arbiters for the inputs or a single arbiter for all the inputs. In one embodiment, the selected data units are not sent using the interconnection network router until a second level of arbitration occurs. Instead, a request representing a selected data unit is sent to an output arbiter (308, 309, 319 and 320) using input to output request routing 318. Like the input arbiter, the output arbiter selects from requests vying for shared resources. After selecting data units, the output arbiter supplies a grant (310, 311, 321 and 322) to selected data units. The grant represents the availability of shared resources for use by the selected data unit. Thus, the interconnection network router uses the grant to determine which data units are sent and when they are to be sent.

In another embodiment of the present invention, a selection from an input arbiter represents an intermediate grant to the selected data unit, and the interconnection network router allows the data unit access to some of the shared resources. For example, the data unit can be sent to an intermediate location between the input and the destination output. If the data unit receives a grant from an output arbiter, the data unit is sent from the intermediate location to the output. If the data unit does not receive a grant from the output arbiter, the data unit can remain at the intermediate location (e.g., in a buffer) until selected by the output arbiter, if possible. Otherwise (e.g., if there is no intermediate location to store the data unit), the data unit is selected again by the input arbiter before requesting a grant from the output arbiter.

In one example, the interconnection network router implements the input arbitration level using several input arbiters. Each input arbiters corresponds to one or more inputs and selects data units from the corresponding inputs. The input arbiters are physically located near the corresponding inputs. This is particularly useful for reducing the wiring necessary to connect the requests to the arbiters. The request for the selected data units are sent to an output arbiter. The output arbiter collects the requests from various input arbiters and issues a grant to a selected data unit.

In one embodiment of the present invention, the outputs of the sub-switch can be connected to the global arbiter. This implementation is particularly useful for implementing a local output arbitration scheme in the router as discussed herein.

Figure 4:
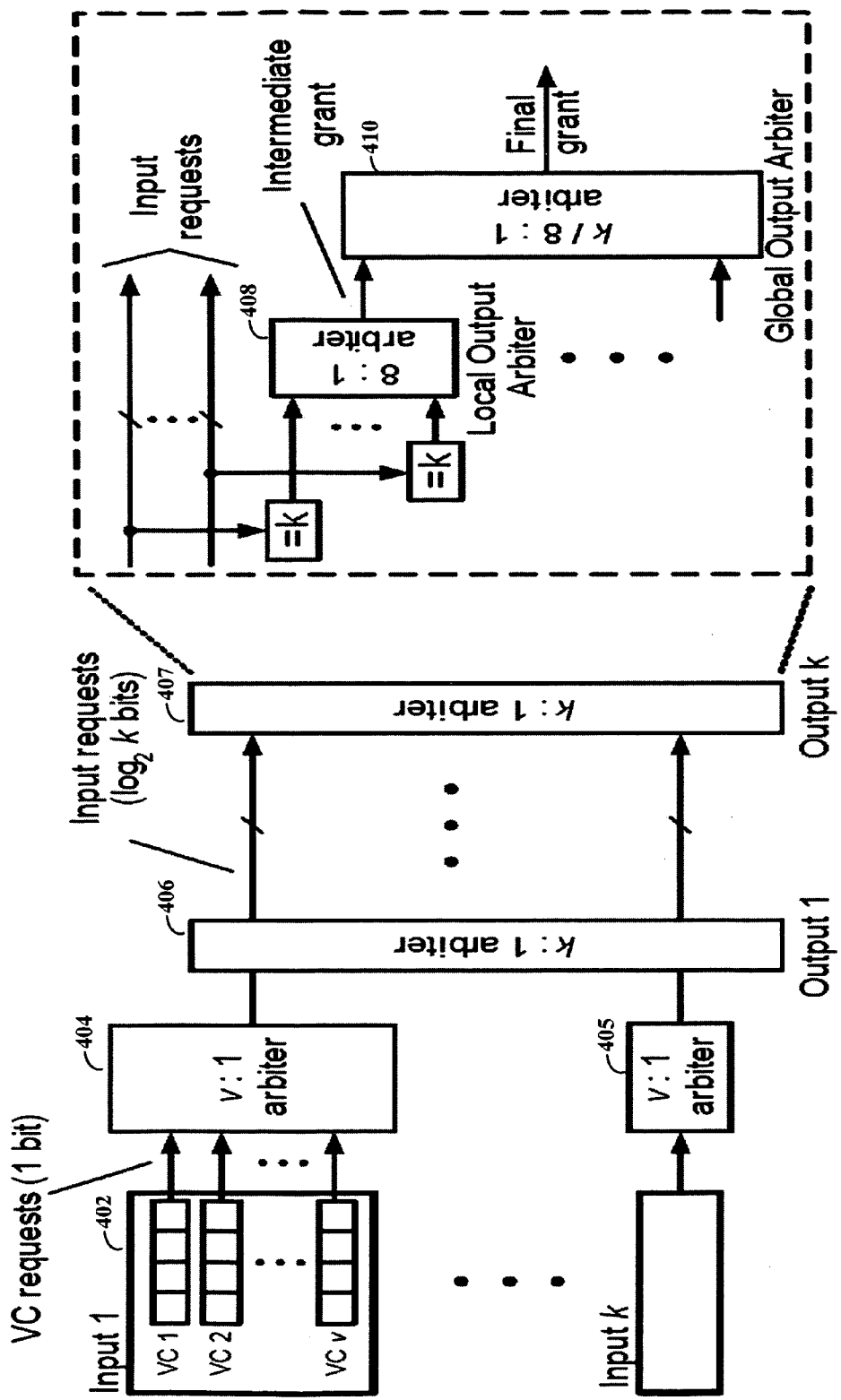
FIG. 4 shows a specific distributed arbitration scheme, according to an example embodiment of the present invention.

FIG. 4 shows a diagram of a specific distributed arbitration scheme, according to an example embodiment of the present invention. The diagram shows three arbitration stages: local input arbitration (blocks 404 and 405), local output arbitration (block 408), and global output arbitration (block 410). The diagram also shows several virtual channels (VC1 to VCv) associated with input controller 402. Several virtual channels are associated with a single physical input channel. Such virtual channels are implemented using a buffer that stores data packets received at the channel input.

During the input arbitration stage, input virtual channels are selected by local input arbiters (404 and 405). The selected virtual channels request access to an interconnection network resource, such as a crossbar switch, from an input arbiter. The input arbiter selects a winning virtual channel. For each winning virtual channel, the input arbiter then forwards a request to the appropriate output arbiter (406 and 407) by driving the binary code for the requested output onto a per-input set of horizontal request lines.

At each output arbiter, the input requests are decoded, and each local output arbiter (408) selects a request (if any) for its switch output from among a local group of "m" (in FIG. 4, m=8) input requests and forwards this request to the global output arbiter (410). Finally, the global output arbiter selects a request (if any) from among the k/m local output arbiters to be granted access to its switch output. For very high-radix routers, the two-stage output arbiter can be extended to a larger number of stages.

At each stage of the distributed arbiter, the arbitration decision is made over a relatively small number of inputs (e.g., 16 or less) such that each stage can fit in a clock cycle. For the first two stages, the arbitration is also local—selecting among requests that are physically co-located. For the final stage, the distributed request signals are collected via global wiring to allow the actual arbitration to be performed locally. Once the winning requester for an output is known, a grant signal is propagated back through to the requesting input virtual channel. To ensure fairness, the arbiter at each stage maintains a priority pointer which rotates in a round-robin manner based on the requests, although other schemes can be used to ensure fairness.

Figure 5:
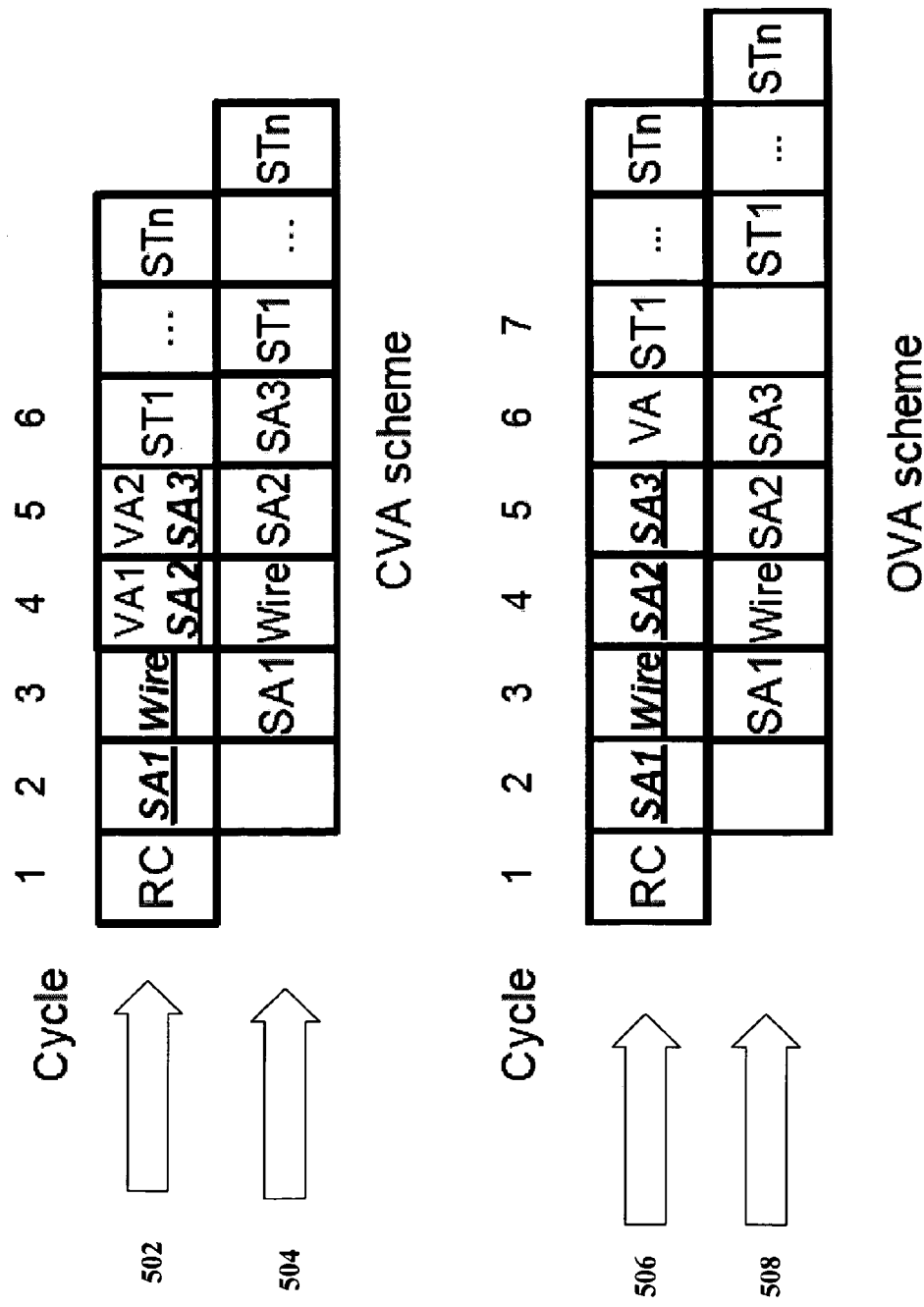
FIG. 5 shows a timing diagram for two virtual channel allocation schemes, according to an example embodiment of the present invention.

FIG. 5 shows a diagram of two virtual channel allocation schemes, according to an example embodiment of the present invention. More specifically, FIG. 5 shows a crosspoint virtual channel allocation (CVA) scheme and an output virtual channel allocation scheme (OVA). The per-packet actions are initiated as soon as the header flit, the first flit of a packet, arrives. The progression of a packet through a router can be separated into per-packet and per-flit steps:

1. Route computation (RC)—based on information stored in the header, the output port of the packet is selected.
2. Virtual-channel allocation (VA)—a packet must gain exclusive access to a downstream virtual channel associated with the output port from route computation. Once these per-packet steps are completed, per-flit scheduling of the packet can begin.
3. Switch allocation (SA)—if there is a free buffer in its output virtual channel, a flit can vie for access to the crossbar.
4. Wire—separate pipeline stage for the request from the input arbiters to travel to the output arbiters.
5. Switch traversal (ST)—once a flit gains access to the crossbar, it can be transferred from its input buffers to its output and on to the downstream router. These steps are repeated for each flit of the packet and upon the transmission of the tail flit, the final flit of a packet, the virtual channel is freed and is available for another packet.

The order of the steps shown above is displayed in terms of clocks cycles, which are represented by the individual blocks and the corresponding number above those blocks. Time is shown with the earliest clock cycle on the left and the latest clock cycle on the right. Each horizontal row (502, 504, 506 and 508) represents the path taken by a data unit for a flit, according to the corresponding scheme. Rows 502 and 506 represent the header flit path for the CVA and OVA schemes, respectively. Rows 504 and 508 represent a subsequent flit path for the same packet, and thus, the route computation (RC) step, as the route has already been determined for the header flit.

CVA maintains the state of the output virtual channels at each crosspoint and performs allocation at the crosspoints. In contrast, OVA allocation of the output virtual channels occurs at the output of the switch. Both CVA and OVA involve speculation of the virtual channel allocation during switch allocation because the switch allocation occurs before virtual channel allocation is complete. This speculation can be useful in reducing latency. With a deeper pipeline used in a high-radix router, VC allocation is resolved later in the pipeline. If the VC allocation is not given to the flit, and the flit begins the allocation from the start, the completed pipeline stages are wasted. Thus, increasing the pipeline stages between the switch allocation and the virtual channel allocation can result in increased costs associated with incorrect speculation.

With CVA, VC allocation is performed at the crosspoints where the status of the output VCs is maintained. Input switch arbitration is done speculatively. During each cycle, each input controller drives a single request over a per-input set of horizontal virtual-channel-request lines to the local/global virtual output channel arbiter. Each such request includes both the requested output port and output virtual channel. A virtual channel allocator at each crosspoint includes a separate arbiter for each output virtual channel. Instead of the k output arbiters used in the switch allocator (FIG. 4), CVA uses a total of k*v output virtual channel arbiters. Requests (if any) to each output virtual channel arbiter are decoded from the virtual channel request lines, and each arbiter proceeds in the same local-global arbitration used in switch allocation.

Using the OVA scheme, the switch allocation proceeds through all three stages of arbitration, and only when complete, is the status of the output virtual channel checked. If the output VC is indeed free, it is allocated to the flit or packet. As shown in FIG. 5, OVA speculates deeper in the pipeline than CVA and reduces complexity by eliminating the per-VC arbiters at each crosspoint. However, for a given output, OVA only requests one VC per allocation.

Figure 6:
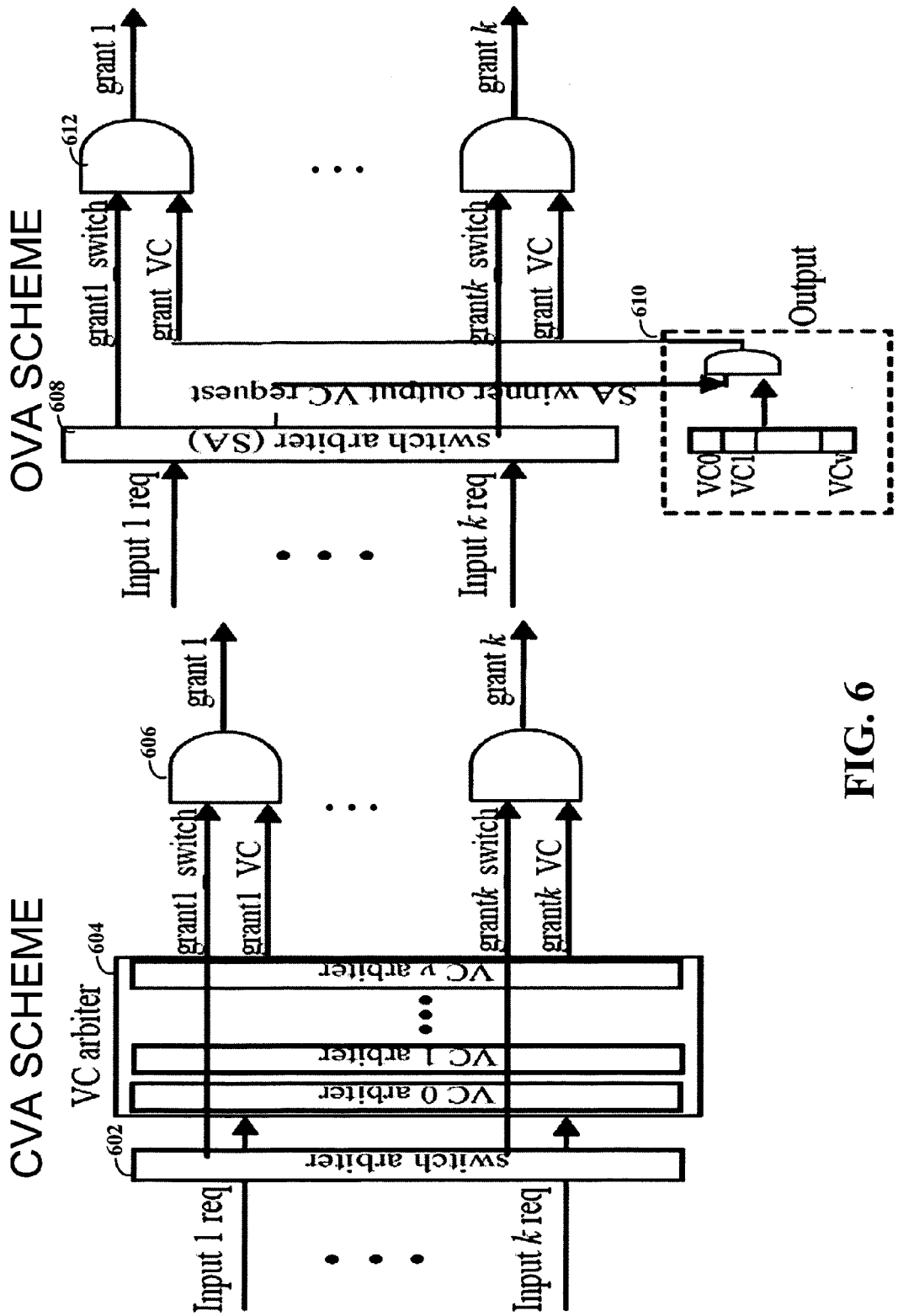
FIG. 6 shows a block diagram of example logic for virtual channel allocation, according to an example embodiment of the present invention.

FIG. 6 shows a block diagram of example control logic for the CVA and OVA schemes, according to an example embodiment of the present invention. Both schemes receive inputs 1 to k and provide grants 1 to k.

For the CVA scheme, the switch arbiter 602 and VC arbiter 604 select from received input requests 1-k. The switch arbiter provides a grant to gate 606 based upon the crosspoint switch availability. The VC arbiter provides a grant to gate 606 based upon the availability of the output VCs. Using this scheme, multiple requests for the same channel can be handled by the switch arbiter and VC arbiter in parallel. A grant is only provided by gate 606 if both the VC arbiter and switch arbiter provide a grant.

For the OVA scheme, the switch arbiter 608 selects data units based upon the crosspoint switch availability. The switch arbiter provides a request to the appropriate output arbiter 610 and also a grant to gate 606. The output arbiter 610 uses the received request to provide a corresponding grant based upon VC availability. Using this scheme, the switch arbitration and output arbitration are performed serially and only a single request for each output is made.

Figure 7:
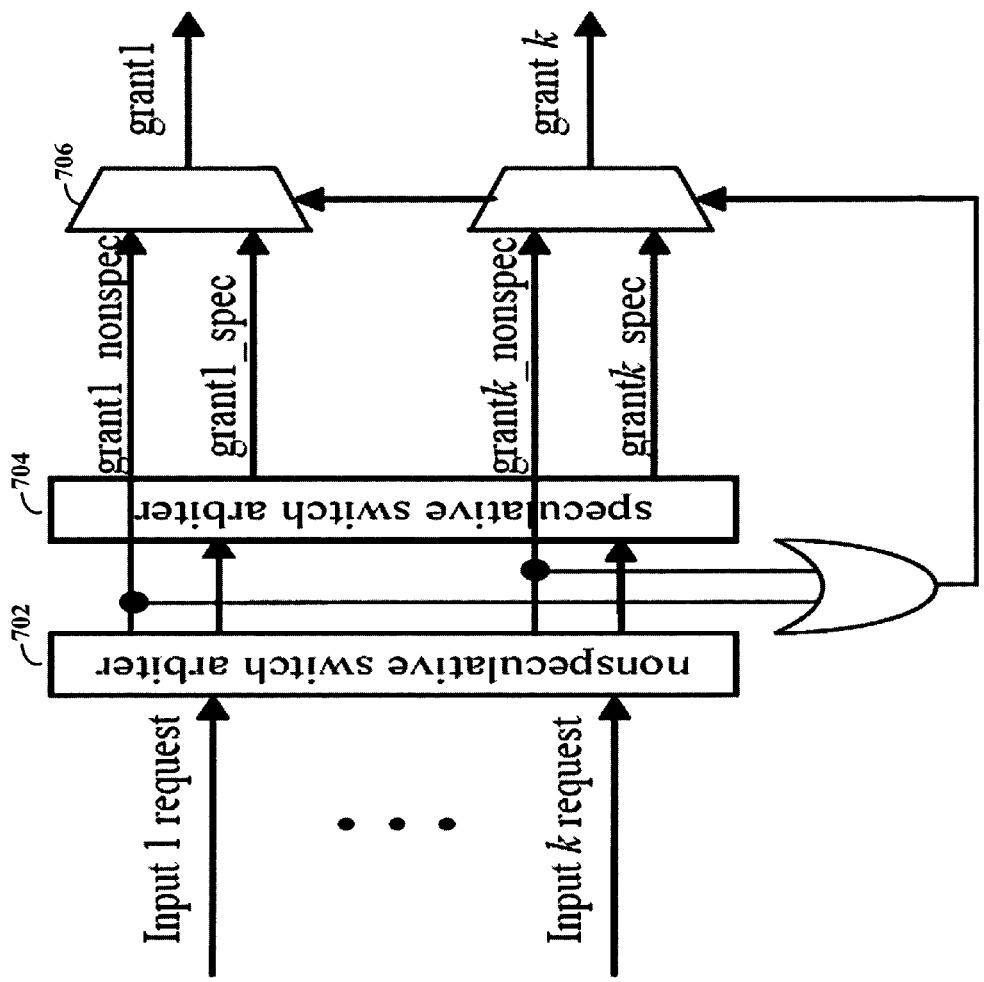
FIG. 7 shows a diagram for a scheme to prioritize non-speculative grants, according to an example embodiment of the present invention.

FIG. 7 shows a diagram for a scheme to prioritize non-speculative grants, according to an example embodiment of the present invention. In one embodiment, bandwidth loss due to speculative VC allocation can be reduced by giving priority to nonspeculative requests. This can be accomplished, for example, by using separate switch allocators for nonspeculative and speculative requests as shown by blocks 702 and 704, respectively. Multiplexer 706 is used to select between nonspeculative and speculative grants. Using this arrangement, a speculative request is granted bandwidth only if there are no nonspeculative requests. Prioritizing nonspeculative requests in this manner can be particularly useful to reduce bandwidth loss.

This patent document fully incorporates the attached Appendix which is an article entitled, "Microarchitecture of a High-Radix Router." This article provides discussion of certain embodiments that relate to and support the above-disclosed figures and associated discussion, as can be recognized by a careful review.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. In addition, one or more of the above example embodiments and implementations may be implemented with a variety of approaches, including multiprocessor systems, complex memory systems, chipset communications and input-output handling. These approaches are implemented in connection with various example embodiments of the present invention. Such modifications and changes do not depart from the true scope of the present invention, including that set forth in the following claims.

What is claimed is:

1. For routing data packets, having one or more data units, between a set of router inputs and a set of router outputs, an interconnection network router arrangement comprising:
    an array of sub-switches having a plurality of sub-switch inputs and a plurality of sub-switch outputs, the sub-switch capable of selectively transferring a data unit from the sub-switch inputs to the sub-switch outputs, the sub-switch outputs of at least some of the sub-switches configured to send the data unit to a sub-switch input of other sub-switches;
    at the sub-switch inputs, a memory circuit for storing the data unit before the data unit is transferred to a sub-switch output;
    at the sub-switch outputs, a memory circuit for storing the data unit after the data unit is transferred from the sub-switch inputs and before the data unit is sent to a router output;
    a plurality of shared interconnection resources, each resource having a communicative connection to respective inputs of at least two sub-switches, to direct at least one data unit from one of multiple virtual channels to a sub-switch input;
    a virtual channel memory circuit configured and arranged to provide the multiple virtual channels for each router input;
    a speculative arbitration circuit; and
    a nonspeculative arbitration circuit, wherein the speculative arbitration circuit and the nonspeculative arbitration circuit provide a grant for use of a shared resource and a nonspeculative grant is given priority over a speculative grant.

2. For routing data packets, having one or more data units, between a set of router inputs and a set of router outputs, an interconnection network router arrangement comprising:
    a set of input arbitration circuits that select a data unit from a group of data units and that include a speculative arbitration circuit and a nonspeculative arbitration circuit, the speculation arbitration circuit indicating a prediction about the availability of a shared resource and thereby providing a grant therefore;
    in response to a selection by the set of input arbitration circuits, sending selected data units using a shared interconnection resource;
    a set of one or more second arbitration circuits for selecting, after the step of sending, a data unit from the selected data units; and
    a virtual channel memory circuit communicatively coupled to at least some of the arbitration circuits and configured and arranged to provide multiple virtual channels for each router input.

3. The arrangement of claim 2, further comprising an array of sub-switches having a plurality of sub-switch inputs and a plurality of sub-switch outputs, the sub-switch capable of selectively transferring a data unit from the sub-switch inputs to the sub-switch outputs.

4. The arrangement of claim 2, further comprising a third arbitration circuit for selecting a data unit from the data units selected by said set of one or more second arbitration circuits.

5. The arrangement of claim 2, wherein the speculative arbitration circuit and the nonspeculative arbitration circuit provide a grant for use of a shared resource and a nonspeculative grant is given priority over a speculative grant.

6. The arrangement of claim 2, wherein the input arbitration circuits are decoupled from output arbitration circuits.

7. The arrangement of claim 6, further comprising a memory for storing data units selected by the input arbitration circuits.

8. The arrangement of claim 2, wherein the interconnection network router arrangement is implemented in a single integrated circuit.

9. The arrangement of claim 2, wherein the shared interconnection includes a crossbar switch.

10. The arrangement of claim 2, wherein the interconnection network router arrangement sends data between central processing units in a multiprocessor computer system.

* * * * *